(12) United States Patent
Kikuta et al.

(10) Patent No.: US 6,510,014 B2
(45) Date of Patent: Jan. 21, 2003

(54) DISTURBANCE DETECTION CIRCUIT, MEMORY DEVICE THEREOF, AND DISTURBANCE DETECTION METHOD

(75) Inventors: Toshiyuki Kikuta, Hiratsuka (JP); Takao Horiguchi, Odawara (JP); Tsuyoshi Arai, Odawara (JP); Yoshikatsu Fujii, Atsugi (JP); Shinji Matsushita, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/761,736

(22) Filed: Jan. 18, 2001

(65) Prior Publication Data

US 2002/0027733 A1 Mar. 7, 2002

(30) Foreign Application Priority Data

Sep. 1, 2000 (JP) ........................................ 2000-269874

(51) Int. Cl.[7] .............................................. G11B 19/04
(52) U.S. Cl. .............................. 360/60; 360/75; 360/53; 360/31; 369/53.42; 340/669; 340/683
(58) Field of Search ...................... 369/53.1, 53.42, 369/53.33, 53.18, 53.12; 360/60, 75, 53, 31, 97.02; 324/210, 212, 226; 340/669, 683

(56) References Cited

U.S. PATENT DOCUMENTS

| | | | |
|---|---|---|---|
| 6,115,200 A | * | 9/2000 | Allen et al. .................... 360/75 |
| 6,178,058 B1 | * | 1/2001 | Pan et al. ................. 360/77.02 |
| 6,226,140 B1 | * | 5/2001 | Serrano et al. ............... 360/75 |

FOREIGN PATENT DOCUMENTS

JP         11126412 A1   *   5/1999   ................. 360/60

* cited by examiner

Primary Examiner—Alan T. Faber
(74) Attorney, Agent, or Firm—Antonelli, Terry, Stout, & Kraus, LLP (57) ABSTRACT

In a magnetic disk device and other memory devices, the scale and cycle of disturbance applied to each memory device are monitored to make a distinction between a harmful shock and harmless vibrations and detect the disturbance. Values at at least two points, of a waveform signal corresponding to the disturbance are captured. A) The above distinction is carried out from the size or magnitude of the inclination of a straight line defined by the two points. B) The function of capturing and storing the waveform signal corresponding to the disturbance as digital data, and outputting a slice level value for providing suitable detection sensitivity from a conversion table based on the digital data, or correcting and adjusting it and outputting the result is further set.

8 Claims, 7 Drawing Sheets

DISTURBANCE DETECTION CIRCUIT, MEMORY DEVICE THEREOF, AND DISTURBANCE DETECTION METHOD

BACKGROUND OF THE INVENTION

1. Field of the Invention

The present invention relates to vibration or shock detection for protecting a memory device from disturbance applied to the memory device, and particularly to the function of making a distinction as to the type of disturbance (vibrations and shock) and detecting it.

2. Description of the Related Art

In a magnetic disk device and other memory devices built in a notebook personal computer or a mobile computer, a minimum level to be detected has heretofore been fixed and set in advance to make full use of a shock detecting function of each device. Therefore, the device did not cope with variations in the scale of an actual shock and the cycle of actual vibrations due to a good or bad decision as to the state of its mounting to a system, and shifts or differences in detection sensitivity due to changes in individual characteristics of detection systems every devices and environmental conditions. Further, the device was low in detection accuracy and not capable of avoiding misdetection due to noise.

Incidentally, there is known Japanese Published Unexamined Patent Application No. Hei 11-126412, which corresponds to the Patent Application filed by the same applicant as the present application and relates to a technique capable of resuming a write operation interrupted by the application of a shock after retry waiting for the shortest time corresponding to the amount of the shock.

The scale and components of a shock applied to a memory device vary widely due to the way of placing the memory device in a system, its position and direction, and other factors. There may be cases in which electromagnetic noise, particularly, a pulsated noise signal is misdetected as disturbance. In addition to it, there was a case in which a difference would occur between a detected level and each of actual shock and/or vibrations due to variations in the performance for each device and changes in environmental condition. That is, due consideration has not been given to the fact that misdetection is produced due to vibrations and noise other than a shock to be detected and other disturbance to thereby degrade the performance of the entire device (excessive or over-detection) and the fact that data stored in the memory device will suffer damage due to the deficiency of detection sensitivity (under-detection).

BRIEF SUMMARY OF THE INVENTION

There is provided the function of monitoring the scale and cycle of disturbance to thereby detect harmful disturbance. To this end, information about at least two points are captured from a signal waveform, which is an analog signal waveform corresponding to disturbance and is represented by time-amplitude coordinates, thereby to extract information corresponding to the scale and cycle of the disturbance. Even either analog signal processing or digital signal processing can obtain this function.

A) As to the analog signal processing, for example, an inclination defined by two points on coordinates of time t-amplitude h is monitored as information corresponding to the scale and cycle of disturbance. The above function is produced or exerted owing to the occurrence of the disturbance. Thus, the difference ($\Delta h$) in amplitude is detected as an analog signal by a hardware circuit from an amplitude value at a time at a first point immediately after its production and an amplitude value after a small time ($\Delta t$) has elapsed. If $\Delta h/\Delta t$ is greater than or equal to a predetermined value, then a detection signal is outputted as undesired disturbance (shock). If $\Delta h/\Delta t$ is less than the predetermined value, then no detection signal is outputted with the disturbance as allowable vibrations. When it is desired to detect one not high in frequency, of the disturbance, the detection thereof can be implemented even by software as an alternative to hardware.

Exerting (triggering) the function by the disturbance is obtained by an increase in the sensitivity of a shock sensor used as a disturbance sensor. The amplitude of an analog signal corresponding to disturbance at a second point after the elapse of a time $\Delta t$, is captured based on a trigger subsequent to the removal of cycle-short noise disturbance by a predetermined filter. If $\Delta t$ is settable and only the amplitude at the second point is captured with respect to the constant $\Delta t$, then the calculation of $\Delta h$ is implemented by a hardware logic circuit. Therefore, a processing speed for its calculation is sufficiently fast for the detection of undesired disturbance. An acceleration sensor comprised of a semiconductor element or a piezoelectric element is used as the shock sensor. Sensors using piezo elements include a voltage type and a capacity (charge) type according to the type of output subsequent to the detection and conversion of disturbance. Both of them change somewhat in circuit configuration of a first amplifier and can be used in applications of the present invention. Incidentally, each waveform illustrated in the present specification is one outputted from the voltage type sensor.

B) As to the digital signal processing on the other hand, for example, the scale and cycle of disturbance are captured as digital data and a conversion table is created in advance based on them. The processing B) is carried out in parallel with the processing A) to thereby allow the storage of disturbance (shock) data while coping with a harmful shock.

Further, a plurality of embodiments each having a disturbance detection circuit or a disturbance detecting function have been disclosed which are configured so as to output slice level values for providing suitable detection sensitivity, based on the data stored in the conversion table or effect correction adjustments thereon and output them. In such embodiments, the circuit comprises hardware elements capable of high-speed operation and detects disturbance with suitable sensitivity corresponding to the disturbance (vibrations or shock). A conversion table is produced according to a statistical procedure and only the table may be mounted in a memory device and detected. That is, the scale and cycle of a shock are grasped or held as digital data and the slice of shock sensitivity is automatically corrected and adjusted by the device per se, whereby misdetection is reduced and the reliability of data protection of the device is enhanced consequently.

Described more specifically, 1) an integrated value and a cycle of an analog waveform of disturbance detected by a shock sensor are sampled at high speed by a peak hold (sample-and-hold) circuit and captured as digital data. 2) A suitable slice value is selected from a conversion table stored in a ROM and another memory element as default values in advance. 3) A command for changing a detection slice voltage is sent out to a detection/determination slice unit capable of changing a detection slice voltage for determining a threshold value for detection. 4) When the digital data corresponding to the disturbance is captured, the range for the scale and cycle of a shock, which makes detection effective, is limited for the sake of the removal of noise (it is waveform-shaped by a low-pass filter). 5) The frequency of occurrence of disturbance, a cumulative value and other information are added to the digital data as history information corresponding to the disturbance. 6) A learning function such as the speeding up of a detecting process or the application of correction to the detecting process is provided to cope with subsequently- generated disturbance. 7) An embodiment of a magnetic disk device will further be explained. When a shock corresponding to undesired disturbance occurs, the amount of overrun of a magnetic head and the rate of generation of an error thereof with respect to the magnitude of the shock are determined according to temperatures, a power source, hours for use, other use environmental conditions, and data read, data write, seek, following and other operation modes or the like. Thus, correction values are individually and specifically calculated according to the type of these parameters and disturbance (shock), and hence the accuracy of disturbance detection and correction-value adjustments can be improved. 8) There is also provided the function of allowing a user to adjust each detected level at random according to a vendor unique command on an interface through a host system within a limited allowable range in which a stable operation can be ensured even if disturbance exists.

According to the technology disclosed in the present invention, since the cycle and amplitude of disturbance are monitored, more specifically, the disturbance is monitored at at least two points on a signal waveform corresponding to the disturbance and the inclination of the rising edge of a disturbance signal is monitored or supervised from their times and amplitude, a shock harmful to a device can be detected and hence distinguished from allowable vibrations.

Further, the device per se can capture the scale and cycle of disturbance (shock/vibrations) as digital data and store them therein. Based on it, the device can output a slice level value for providing suitable detection sensitivity from a conversion table or can provide its output as a corrected/adjusted output. Therefore, the disturbance can be detected correctly with the optimum sensitivity or sensitivity close thereto corresponding to a system equipped with a disturbance detection circuit, its on-board state, environmental conditions and other conditions.

DETAILED DESCRIPTION OF THE PREFERRED EMBODIMENTS

Preferred embodiments illustrated in the accompanying drawings will hereinafter be described in detail.

Figure 1:
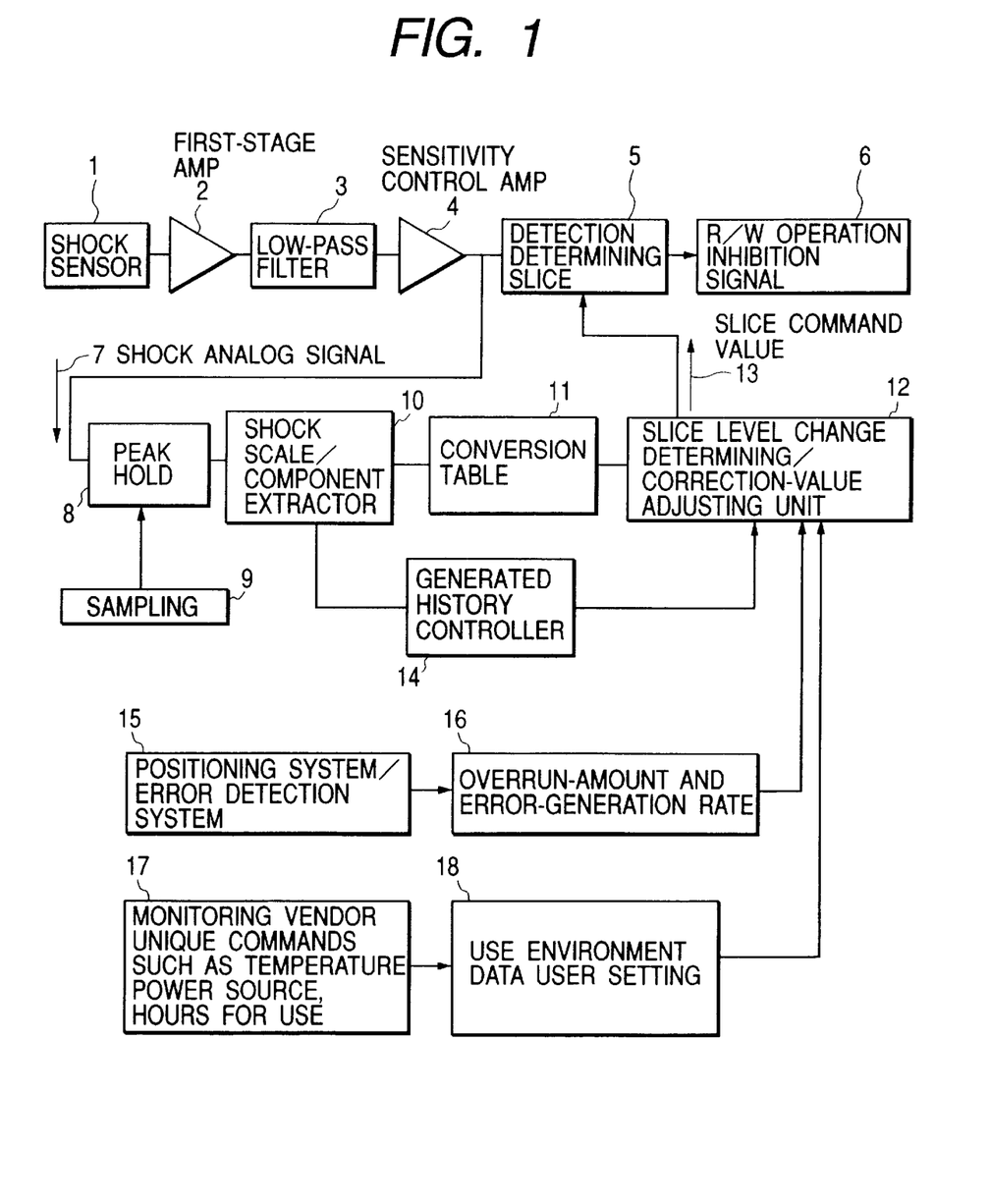
FIG. 1 is a diagram showing a first embodiment of a magnetic disk device to which the present invention is applied.

FIG. 1 is a diagram showing a first embodiment in which a disturbance detection circuit, which embodies the present invention, is applied to a magnetic disk unit or device as a memory device.

A shock applied to the magnetic disk device is detected by a shock sensor 1 as an analog electric signal, which in turn passes through a first-stage amplifier 2, a low-pass filter 3 and a sensitivity control amplifier 4. A detection determining slice 5 compares it with a detection slice set to the lowest level to be detected and outputs a value having a level exceeding the value of a slice in the form of a logical signal. Afterwards, the detection determining slice 5 transmits the signal to a device as a R/W operation inhibition signal 6 indicative of the notification of the detection of harmful disturbance (shock) to the magnetic disk device. This signal serves so as to inhibit a read/write (R/W) operation of the device.

The shock analog signal 7 is an analog signal obtained by filtering and amplifying one produced by converting the shock into the electric signal by the shock sensor 1 and includes information such as the scale or magnitude, cycle and direction of the shock, etc. A peak hold 8 is supplied with a sampling period or cycle sufficiently faster than the cycle of the shock analog signal 7 from a sampling 9 and peak (sample)-holds the shock analog signal 7 for each time of sampling.

The shock scale/component extractor 10 triggers an internally-provided counter or high-speed A/D converter, based on respective output values held by the peak hold 8 and extracts respective components with the time elapsed before each output value returns to the original level as cycle data, and each integrated value as scale data. Incidentally, the shock analog signal 7 is a signal waveform analogous to a half cycle of a sine wave, which takes a peak value with time and is reduced to near a reference voltage. Based on the extracted digital data, a memory access interface circuit comprised of high-speed logic obtains access to a ROM or RAM prepared in advance and selects data values for setting a slice voltage corresponding to the shock to the detection determining slice 5 from a conversion table 11 in which values corresponding to the respective data about the cycle and scale of the shock have been made up in matrix form.

A slice level change determining/correction-value adjusting unit 12 directly outputs output data outputted from the conversion table 11 or adds respective corrections to thereby output a slice command value 13, thereby adjusting the slice voltage for the detection determining slice 5.

The data extracted by the shock scale/component extractor 10 is stored in a generated history controller or manager 14 as a history of the occurrence of the shock. The generated history manager 14 stores a cumulative total of the number of times that the shock occurs, generating conditions, a post-detection device operation and other information therein and helps an improvement in detection accuracy and a correcting operation by the slice level change determining/correction-value adjusting unit 12. The generated history manager 14 may be caused to have a learning function.

Further, a positioning system/error detection system 15 is also capable of effecting correction on the slice level change determining/correction-value adjusting unit 12 with the amount of overrun of a magnetic head and an error generation rate 16 and other error information as parameters and performing fine adjustments according to temperatures, a power source, hours for use and other environment monitoring data under which the magnetic disk device and a system having it are placed. A user-based correction setting function can also be added in such a manner that a user who imagines even that the device is degraded in operation performance according to the conditions of the protection of data by the inhibition of the R/W operation and places emphasis on its performance, is able to lighten up or relax a data protection function within an allowable range. Controlling the slice level change determining/correction-value adjusting unit 12 through use environment data user-based settings 18, based on monitoring vendor unique commands such as temperatures, a power source, hours for use allows the execution of these.

Owing to these configurations, the cycle and amplitude of disturbance are collected. In a practically-used device, only result information brought into parameter form may be stored and placed in a ROM or another non-volatile storage element. The present invention distinguishes between shocking or impulsive disturbance having a cycle of a few msec, principally shocking or impulsive disturbance which ranges from about 0.1 msec to about 10 msec (100 Hz to 10 kHz), and vibrational disturbance ranging from 100 msec through 10 msec, which is slower than it, and takes into consideration even their amplitude. Threshold values are additionally defined to enhance the accuracy of detection in a boundary region between the two. As possible countermeasures of the system or the magnetic disk device against the detection of harmful disturbance, may be mentioned, for example, 1) the stoppage of the R/W operation, 2) the operation of ejecting or taking out a magnetic head from a magnetic medium, e.g., the execution of an unload operation when the frequency of occurrence of disturbance increases, etc.

Figure 2:
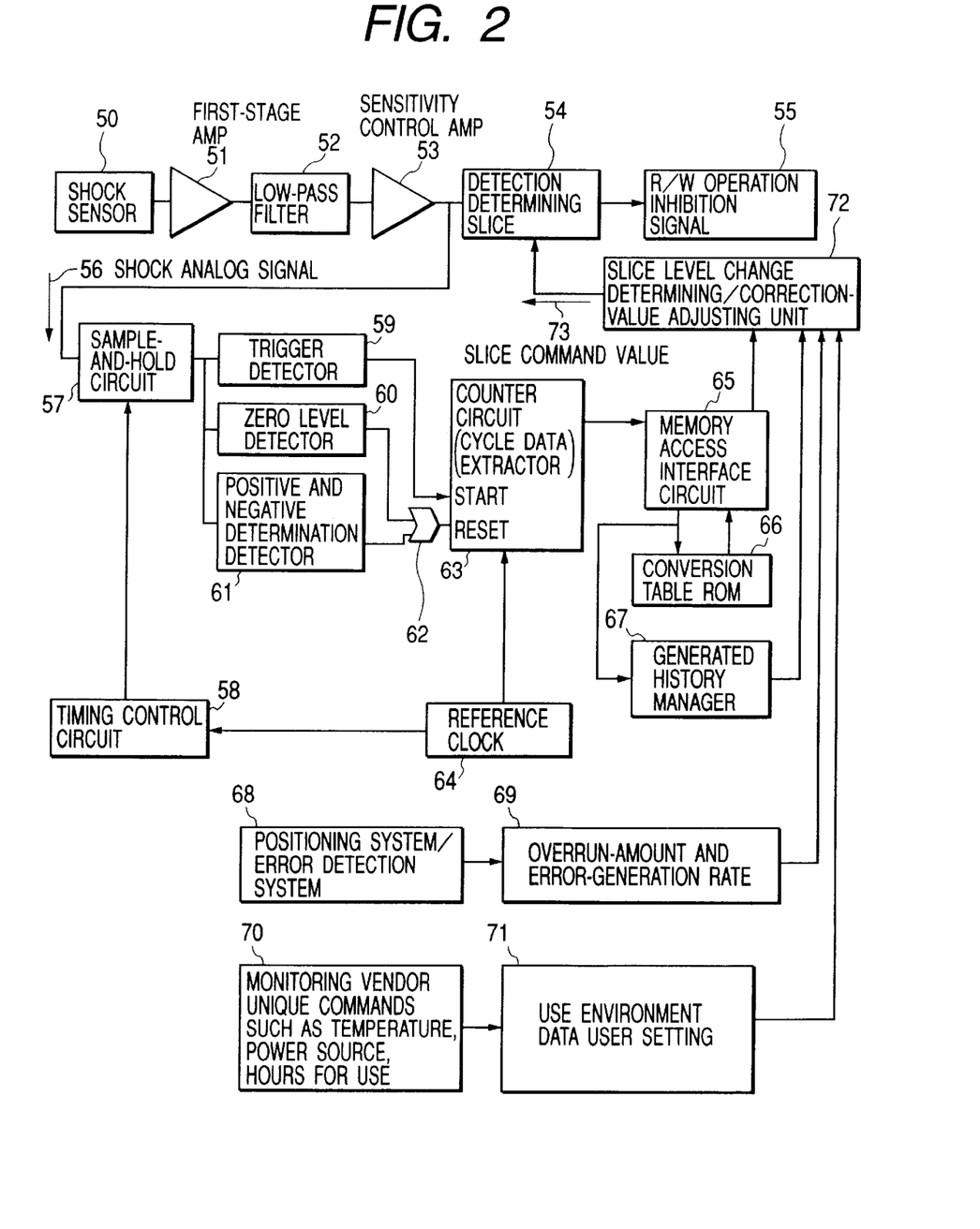
FIG. 2 is a diagram illustrating an example of a configuration of a magnetic disk device illustrative of a second embodiment to which the present invention is applied.

FIG. 2 shows an example of a configuration of a magnetic disk device illustrating a second embodiment to which the present invention is applied.

A sample-and-hold circuit 57 for holding a peak value to a conversion table ROM 66, and a slice level change determining/correction-value adjusting unit 72 are circuits additionally provided inside an LSI which constitutes the magnetic disk device, and comprise hardware logic capable of performing high-speed processing. The sample-and-hold circuit 57 quantizes a shock analog signal 56 as a voltage value for each time in response to a sampling cycle pulse produced from a timing control circuit 58. When a shock is applied to the magnetic disk device, a hold voltage value outputted from the sample-and-hold circuit 57 is compared with a reference voltage value by a trigger detector 59. The trigger detector 59 triggers a counter circuit (cycle data extractor) 63. The counter circuit (cycle data extractor) 63 starts a counter in response to a trigger outputted from the trigger detector 59.

The shock analog signal 56 is a signal waveform analogous to a half cycle of a sine wave, which takes a peak value with time and is reduced to near the reference voltage value. When a zero level detector 60 and a positive and negative determination detector 61 detect that the hold voltage value of the sample-and-hold circuit 57 has reached about the reference voltage or passed therethrough, they cause the counter circuit (cycle data extractor) 63 to stop and transmit a counter value to a memory access interface circuit 65.

The memory access interface circuit 65 transmits the resultant counter value to a conversion table ROM 66 and a generated history controller or manager 67 as cycle data. The conversion table ROM 66 selects a table value corresponding to the transmitted cycle data and returns it to the memory access interface circuit 65. The memory access interface circuit 65 sends the returned cycle data to a slice level change determining/correction-value adjusting unit 72, which in turn changes a slice level voltage value of a detection determining slice 54 according to a command value.

The generated history manager 67 allows a ROM, a magnetic disk medium or another memory to store the cycle data in association with each generated cumulated value and the state of the magnetic disk device and other environment information and uses it for a learning function as the history of occurrence of the shock. Since a sufficient high frequency is used as a reference clock 64 to perform the above operation at high speed. The slice level change determining/correction-value adjusting unit 72 is provided with an adder and another computing unit and implements a correcting function in such a manner that a slice level can be fine-adjusted by adding an overrun-amount and error-generation rate 69, use environment data user setting 71 and other data obtained from a CPU provided in the magnetic disk device.

Incidentally, the memory access interface circuit 65 and the slice level change determining/correction-value adjusting unit 72 are respectively also provided with the function of limiting the range of cycle data to be captured for the purpose of removing a noise component (pulse-shaped waveform) regardless of the shock.

The two circuits corresponding to a positioning system/error detection system 68 and the overrun-amount and error-generation rate 69 for receiving the output thereof, and a monitoring vendor unique commands such as temperatures, a power source, hours for use 70 and the use environment data user setting 71 for receiving the output thereof respectively serve as two correction circuits with respect to a reference of the slice level change determining/correction-value adjusting unit 72. Described specifically, the former is one for determining the amount of deviation from a target value from a POS signal (position signal) employed in the magnetic disk device and outputting a correction to the slice level change determining/correction-value adjusting unit 72.

The latter is used to reduce the sensitivity of a detected level not so as to detect harmless and slow vibrations (low-frequency vibrations ranging from a few hertz to several tens of hertz) when, for example, a user of a magnetic disk device makes use of a notebook personal computer corresponding to a system equipped with the magnetic disk device on the go by vehicle.

Figure 3:
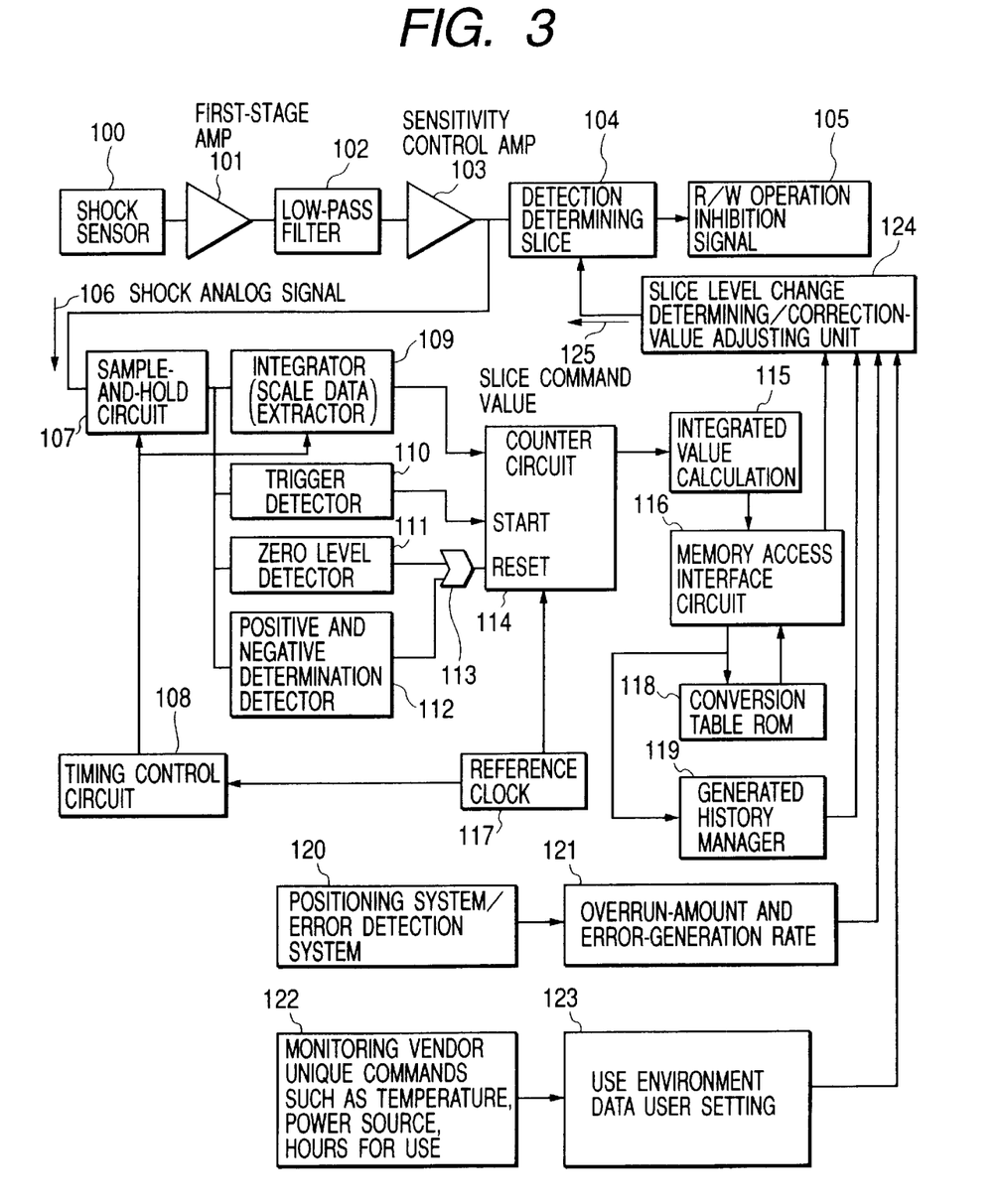
FIG. 3 is a diagram depicting an example of a configuration of a magnetic disk device illustrative of a third embodiment to which the present invention is applied.

FIG. 3 is an example of a configuration of a magnetic disk device illustrating a third embodiment to which the present invention is applied.

A sample-and-hold circuit 107 through a conversion table ROM 118, and a slice level change determining/correction-value adjusting unit 124 are electronic circuits added inside an LSI constituting a memory device, and comprise hardware logic capable of high-speed processing. The sample-and-hold circuit 107 quantizes a shock analog signal 106 as a voltage value for each time in response to a sampling cycle pulse produced from a timing control circuit 108 and outputs it to an integrator (scale data extractor) 109. Since the time necessary for timing provided to charge/discharge a capacitor, corresponding to an input hold voltage is developed in the integrator (scale data extractor) 109, it is counted by a counter circuit 114 as scale data to thereby calculate an integrated value. Timing provided to take in or capture the integrated value is produced by a trigger detector 110, a zero level detector 111 and a positive and negative determination detector 112.

A memory access interface circuit 116 transmits the resultant integrated value to the conversion table ROM 118 and a generated history manager 119 as scale data. The conversion table ROM 118 selects a table value corresponding to the transmitted scale data and sends it back to the memory access interface circuit 116.

The memory access interface circuit 116 sends the sent-back data to the slice level change determining/correction-value adjusting unit 124. The slice level change determining/correction-value adjusting unit 124 changes a slice level voltage value of a detection determining slice 104 according to a command value. The generated history manager 119 allows a ROM, a magnetic disk medium or another memory to store cycle data in association with each generated cumulated value and the state of the magnetic device and other environment information, and uses it for a learning function as the history of occurrence of a shock.

Since a sufficient high frequency is used as a reference clock 117 to perform the above operation at high speed. The slice level change determining/correction-value adjusting unit 124 is provided with an adder and another computing unit and implements a correcting function in such a manner that a slice level can be fine-adjusted by adding data such as a positioning system/error detection system 120, monitoring vendor unique commands 122 such as temperatures, a power source, hours for use, etc. obtained from a CPU provided inside the memory device. Incidentally, the memory access interface circuit 116 and the slice level change determining/correction-value adjusting unit 124 are respectively also provided with the function of limiting the range of integrated value data to be captured for the purpose of removing a noise component regardless of the shock. In other respects, circuit elements designated at the same reference numerals as the circuit elements described in FIG. 2 have the same functions as those described in FIG. 2 and their description will therefore be omitted.

Figure 4:
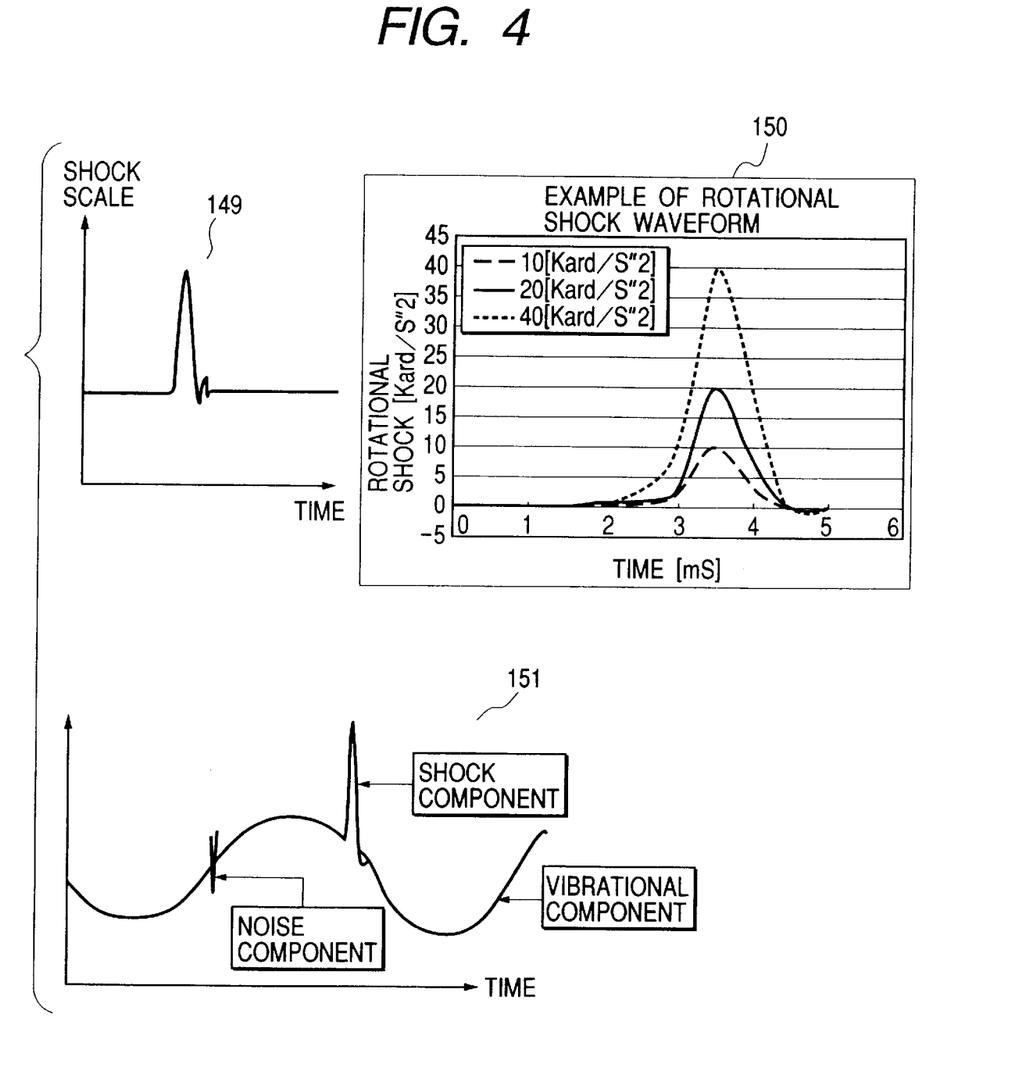
FIG. 4 is a diagram for describing a shock-detected analog waveform.

FIG. 4 is a diagram for describing a shock-detected analog waveform.

Reference numeral 149 indicates a shock ([Go–p]) extending in a translational direction by a single shock sensor. Reference numeral 150 indicates an analog waveform ([Go–p], [rad/S" 2]) of a shock in a rotational direction by two shock sensors (twin shock sensor). Incidentally, the present invention is applicable to either the single sensor or the twin sensor without depending on the number of sensors.

The shock waveform 149 is normally observed in the form of a half cycle-shaped waveform of a sine wave. The scale of the shock is determined by a 0–p value which ranges from a reference voltage value to a peak value. When a shock extending in the same direction as the detecting direction (main-axis direction) of a shock sensor is detected, it results in a positive waveform with respect to the reference voltage, whereas when a shock extending in its opposite direction is detected, it results in a negative waveform with respect to the reference voltage.

Translational-direction components correspond to components as viewed in X-axis, Y-axis and Z-axis directions with a memory device or shock sensor as the reference and respectively result in values obtained by multiplying angles as viewed from the main-axis direction of the sensor by a sine wave or cosine wave. It is advantageous to detect rotational-direction components by the twin shock sensor in terms of the cost. That is, the rotational-direction components are those used to detect rotational acceleration according to a component corresponding to the difference between values detected by two sensors placed with an interval defined therebetween. The shape of the waveform is similar to one extending in the translational direction. When the reference voltage and other basic conditions are stable even in the case of either the translational-direction components or the rotational-direction components, the scale and cycle of a shock can be estimated at its rising portion and a shock-detected slice value can be determined in accordance with it.

However, while designated at numeral 151, for example, is a shock analog waveform of a memory device in a state in which the memory device has been implemented in a system placed in a vibrating state, the excess and deficiency of detection sensitivity might occur or a noise component (about a few microseconds) might be misdetected in the case of each fixedly set shock-detected slice value with respect to such a waveform 151, whereby the accuracy of detection is significantly reduced.

Figure 5:
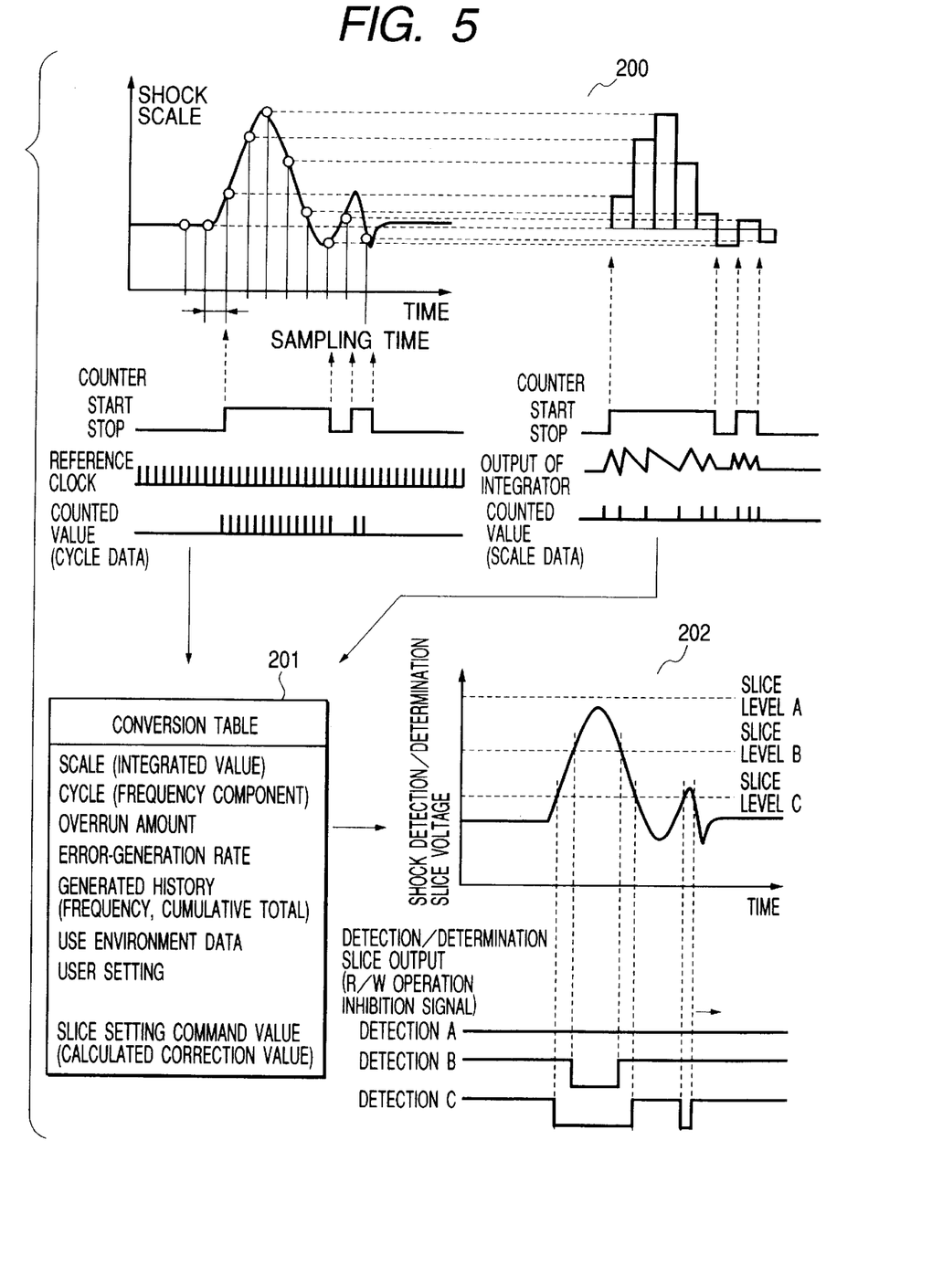
FIG. 5 is a diagram for describing a shock detection/slice control function employed in the present invention.

FIG. 5 is an explanatory view of a shock detection/slice control function.

Designated at numeral 200 is a diagram for describing the operation of extracting cycle data and scale data (integrated value) from a shock analog signal. A trigger detector detects the rising edge of the shock analog signal from the output of a sample-and-hold circuit and starts up a counter to start its counting. When a zero level detector and a positive and negative determination detector detect that a sample hold output has been returned or reset to a reference voltage, the trigger detector stops the counter.

A value counted during that time is captured as the cycle data. Similarly, a pulse is generated with zero-crossing timing for the output of an integrator, at which charge and discharge times change in association with a voltage value outputted from the sample-and-hold circuit. The pulse is counted by the counter to thereby obtain scale data (integrated value). Slice command values corresponding to these digital values are selectively outputted from a conversion table 201 or correction values are added to them to output the result of addition, whereby a shock detection/determination slice voltage is adjusted. Designated at numeral 202 is a diagram for describing at which slice level actually-applied disturbance is determined as vibrations or a shock harmful to a memory device when the shock detection/determination slice voltage is taken as a vertical axis and time is taken as a horizontal axis. If the disturbance is given as an impulsive waveform, it is then unsuitable for the memory device. Therefore, when the cycle of the waveform designated at numeral 202 is small, a slice level C is used to increase detection sensitivity, thereby detecting the slice voltage. On the other hand, when the disturbance is given as a vibrational waveform, it does not exert a bad influence on the memory device so much. Therefore, a slice level A is adopted to make desensitization in detection on the condition that the cycle of the waveform designated at numeral 202 is large. However, since the disturbance is harmful to the memory device when the amplitude thereof is also large even if the cycle is large, vibrations exceeding the slice level A are detected as harmful.

Figure 6:
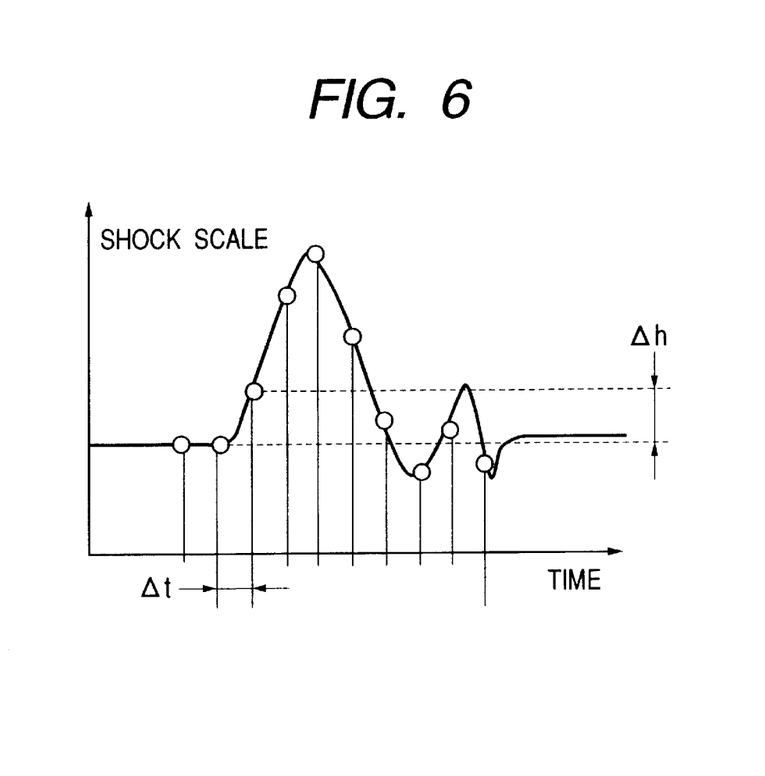
FIG. 6 is an explanatory view showing the process of selecting and detecting two points from an analog signal corresponding to disturbance.
Figure 7:
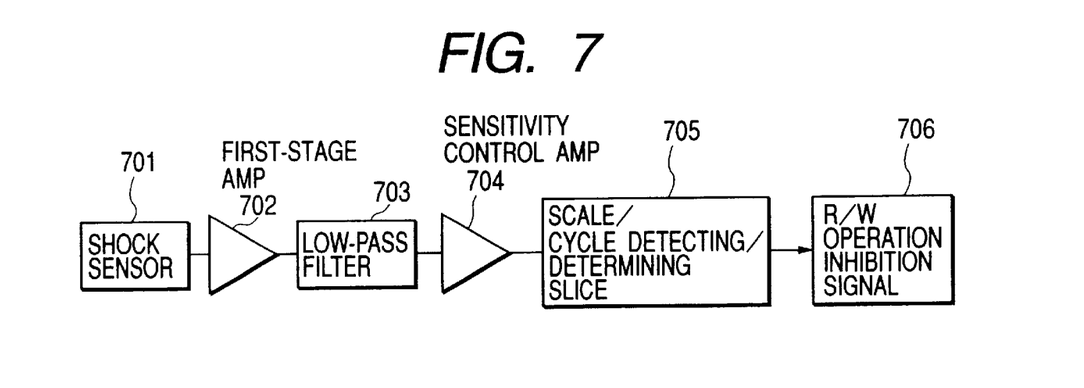
FIG. 7 is a diagram showing an example of a configuration of a magnetic disk device illustrative of a fourth embodiment to which the present invention is applied.

FIG. 6 is an explanatory view illustrating the process of selecting two points from an analog signal corresponding to disturbance, e.g., a shock analog signal, sampling them at intervals of Δt and detecting the same. FIG. 7 is a diagram showing an example of a configuration of a magnetic disk device illustrative of a fourth embodiment to which the present invention is applied.

The output of a shock sensor 701 (see FIG. 7) is sent to a first-stage amplifier 702 where it is amplified so as to reach a suitable magnitude. A noise disturbance signal is removed by a low-pass filter 703, and thereafter the so-processed signal is inputted to a scale/cycle detecting/determining unit 705 through a sensitivity control amplifier 704. The sensitivity control amplifier 704 is a so-called buffer amplifier, which serves so as to transmit an output signal having a sufficient magnitude to the next-stage scale/cycle detecting/determining unit 705 without exerting an influence on a small detected signal from the shock sensor 701.

Figure 8:
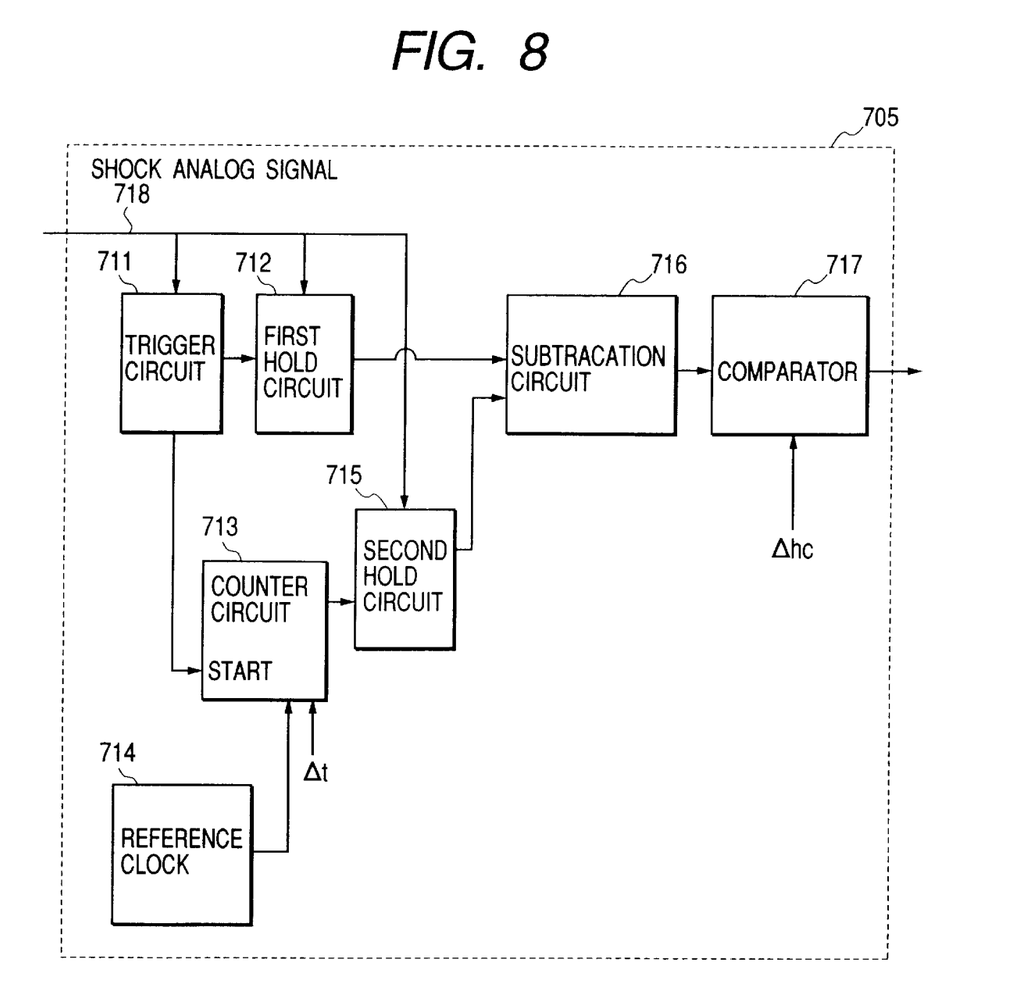
FIG. 8 is a circuit diagram for implementing a scale cycle detecting/determining function employed in the fourth embodiment.

FIG. 8 is a circuit diagram for implementing a scale cycle detecting/determining function employed in the fourth embodiment.

The scale/cycle detecting/determining unit 705 (see FIG. 8) includes a trigger circuit 711 which sends a trigger signal when the amplitude of an input shock analog signal 718 exceeds a predetermined threshold value, and is thereafter desensitized during a predetermined period $\Delta ts$ ($\Delta ts > \Delta t$, see FIG. 6), a first hold circuit 712 which holds the value (first point) of amplitude of the shock analog signal 718 when the amplitude exceeds the predetermined threshold value, a counter circuit 713 which counts a small time corresponding to an externally settable $\Delta t$, a reference clock circuit 714 which generates a reference clock pulse counted by the counter circuit 713, a second hold circuit 715 which holds the value (second point) of amplitude of the shock analog signal 718 after the elapse of the small time corresponding to $\Delta t$, a subtraction circuit 716 which calculates the difference ($\Delta h$, see FIG. 6) between the value held in the second hold circuit 715 and the value held in the first hold circuit 712, and a comparator 717 which compares a pre-settable reference value $\Delta hc$ and an output value ($\Delta h$) of the subtraction circuit 716 and thereby outputs a detected value (e.g., a value of High if given as positive logic) which means harmful disturbance when $\Delta h$ is above $\Delta hc$.

The output of the comparator 717 corresponds to the output of the scale/cycle detecting/determining unit 705 (see FIG. 7) and serves so as to generate a R/W operation inhibition signal 706 (see FIG. 7) corresponding to the next stage for thereby preventing misrecording of the memory device and the disappearance of data. In the next stage of the scale/cycle detecting/determining unit 705, a head on a storage medium may be withdrawn using a load/unload function, for example.

According to the present invention, since the scale and cycle of disturbance are monitored, it is possible to distinguish whether the disturbance is a shock harmful to a memory device or vibrations allowed therefore and thereby detect it from the result of its distinction.

The scale and cycle of the shock to the memory device are captured and stored as digital data. A slice level value for providing or giving suitable detection sensitivity is outputted from a conversion table or set as a corrected/adjusted output, based on the data. Thus, since a distinction can be made between the vibrations and the shock, the disturbance can always be detected with the optimum sensitivity or in the vicinity thereof without depending on an on-board system, its on-board state and environmental conditions. This can aid in easily performing the execution of these detection by the memory device itself.

What is claimed is:

1. A disturbance detection circuit for setting values corresponding to sampling time intervals of a shock sensor system and values each corresponding to a predetermined threshold value, and for sending out an output signal having a value enabling determination of whether a disturbance sampled by the shock sensor system is harmful, based on values corresponding to the scale of the disturbance, at at least two points of a signal waveform corresponding to the disturbance upon detection of the disturbance.

2. A memory device which responds to an impulsive disturbance sampled by a shock sensing system having a scale exceeding a set scale when the impulsive disturbance is applied thereto after a value equivalent to the scale of the impulsive disturbance has been set;

and which does not respond to the impulsive disturbance sampled by the shock sensing system having a scale not exceeding the set scale when the impulsive disturbance is applied thereto.

3. The memory device according to claim 2, wherein the cycle of said impulsive disturbance ranges from 0.1 msec to 10 msec.

4. A disturbance detection method suitable for use in a memory device having one or plural disturbance sensors, which detects a disturbance sampled by a shock detecting system, comprising the steps:

a step for converting the disturbance applied to said memory device into an electric signal waveform;

a step for capturing a scale value and a cycle value of the disturbance; and a step for sending out an output signal having a value enabling determination of whether the disturbance is harmful, from the values of the captured scale and cycle.

5. A disturbance detection method suitable for use in a memory device having one or plural disturbance sensors, which detects a disturbance sampled by a shock detecting system comprising the steps:

a step for converting a disturbance applied to said memory device to an electric signal waveform;

a step for capturing a scale value and a value cycle of the disturbance; and a step for specifying and storing the scale and cycle values of the disturbance.

6. A disturbance detection method suitable for use in a memory device having one or plural disturbance sensors, which detects a disturbance sampled by a shock detecting system comprising the steps:

a step for setting set values corresponding to a scale value and a cycle value of the disturbance to a conversion table;

a step for converting the disturbance applied to said memory device to an electric signal waveform;

a step for capturing the scale value and cycle value of the disturbance; and a step for specifying the scale value and cycle value of the disturbance and outputting the values set to the conversion table, based on the specified scale value and cycle value thereof or alternatively outputting correction values based on the values set to the conversion table.

7. The disturbance detection method according to claim 6, wherein the correction values are values corresponding to the amount of overrun of a magnetic head or an error generation rate thereof with respect to the scale of the disturbance sampled by the shock sensing system.

8. The disturbance detection method according to claim 6, wherein temperatures, a power source, hours for use, and other environmental conditions of the memory device, or read, write, seek and other operation modes of the memory device are further set to the conversion table.

* * * * *